Figure 1:
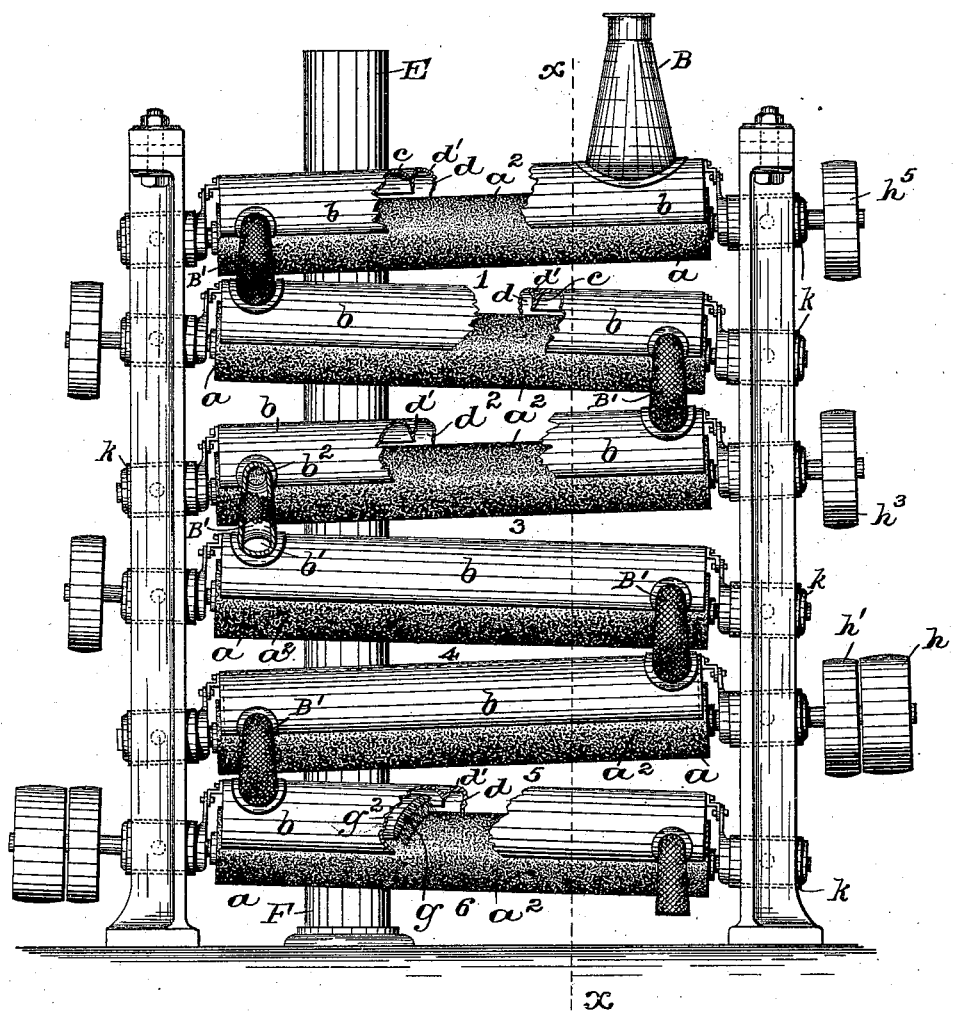

(No Model.)

5 Sheets—Sheet 1.

O. T. BUGG.
COTTON SEED DELINTER.

No. 556,574.

Patented Mar. 17, 1896.

WITNESSES:
A. M. Jones.
E. Gatterer.

INVENTOR:
Owen T. Bugg.

BY Edw. E. Lundy, ATT'Y.

(No Model.)　　　　　　　　　　　　　　5 Sheets—Sheet 2.
O. T. BUGG.
COTTON SEED DELINTER.

No. 556,574.　　　　　　　Patented Mar. 17, 1896.

WITNESSES:　　　　　　　　　　　INVENTOR:
A. M. Jones　　　　　　　　　　　Owen T. Bugg,
E. Gatterer
　　　　　　　　BY　　　　Esber E. Lumly ATT'Y.

(No Model.) 5 Sheets—Sheet 3.
O. T. BUGG.
COTTON SEED DELINTER.

No. 556,574. Patented Mar. 17, 1896.

WITNESSES: INVENTOR:

(No Model.) 5 Sheets—Sheet 5.
O. T. BUGG.
COTTON SEED DELINTER.

No. 556,574. Patented Mar. 17, 1896.

WITNESSES: INVENTOR:
A. M. Jones Owen T. Bugg
E. Gatterer
BY Edw. E. Quimby ATT'Y.

UNITED STATES PATENT OFFICE.

OWEN T. BUGG, OF NEWARK, NEW JERSEY, ASSIGNOR TO THE UNITED STATES EXPORT COMPANY, OF SAME PLACE.

COTTON-SEED DELINTER.

SPECIFICATION forming part of Letters Patent No. 556,574, dated March 17, 1896.

Application filed February 2, 1892. Serial No. 420,124. (No model.)

*To all whom it may concern:*

Be it known that I, OWEN T. BUGG, of Newark, New Jersey, have invented certain Improvements in Cotton-Seed Delinters, of which the following is a specification.

This invention is embodied in a machine for delinting or stripping the fibers from cotton-seed which operates by first detaching the longer fibers and collecting them in one receptacle and in subsequently detaching the shorter fibers and collecting them in another receptacle.

The invention also embraces delinting apparatus composed of a comparatively long and rough-surfaced cylinder rotating at great speed upon a horizontal, or nearly horizontal, axis, and in close proximity thereto a partially-inverted and interiorly-unobstructed trough, which wholly or partially covers one of the upper quarters of the curved surface of the cylinder, and which, with the portion of the curved surface of the cylinder that it covers, constitutes a trunk through which the cotton-seed, by the resultant effect of the forces to which it is subjected, is made to travel from the end of the trunk which is provided with a feed-hopper to the end of the trunk which is provided with a discharge pipe or chute.

The gradual progress of the cotton-seed is effected in the following manner: During its travel through the trunk the mass of cotton-seed is subjected to a violent whirling motion caused by its contact with the rough surface of the rapidly-revolving delinting-cylinder. By each of a series of such contacts the cotton-seeds, by the entanglement of their longer fibers with the rough surface of the delinter, are carried upward against the higher side of the trunk, which lies in or near the vertical plane of the axis of the delinter, with its lower edge just clearing the top of the delinter, so that it constitutes a deflector from which the cotton-seeds rebound concurrently with the detachment from them of those portions of their lint which have been caught upon the rapidly-moving rough surface of the delinter. The deflector may be slightly diagonal with relation to the axis of the delinter, or it may be arranged in a plane which coincides with or is parallel with the vertical plane of the axis of the delinter, provided the axis of the delinter is slightly inclined from the horizontal. In either case when the seeds rebound they tend to fall to a part of the trunk slightly nearer the discharge end than the place from which they were taken when caught by the delinter.

In consequence of the rapidity of rotation of the delinter a very slight inclination of the axis thereof, or a very slight deviation of the deflector from the vertical plane of the axis of the delinter, will suffice to effect a sufficiently rapid travel of the mass of seeds through the trunk from the feed end to the discharge end.

The fiber or lint detached from the seed is thrown off the unobstructed portion of the curved surface of the delinter by centrifugal force into a chamber formed by a jacket partially surrounding the delinter and connected with the suction-pipe of a "condenser" similar to those for "condensing" the cotton from cotton-gins, except that a strong suction is maintained from the suction-pipe and a stronger blast into the condenser.

In a single passage through such an apparatus the cotton-seed will have a greater or less portion of its longer fibers stripped from it according to the length of the delinter employed. Instead of one excessively-long delinter, it is preferred to employ a series of moderately-long delinters arranged at different heights, so that the discharge from the trunks of the higher delinters will be into the hoppers of the trunks of the next lower delinters, respectively.

After one or more passages of the cotton-seed through the apparatus, as the case may be, they will be denuded of their longer fibers, and in their subsequent passages through the apparatus the shorter fibers will be stripped from them, together with particles of the hull or dirt which may be adherent to the seeds. Therefore, in order to effect the separate collection of the longer and cleaner fibers, the jacket of the first or highest delinter, or of two or more of the higher delinters, as the case may be, will be connected with one condenser, by which the longer and cleaner staple is separately collected and condensed, while the jackets of the lower cylinders will be connected with another condenser, which will collect and condense the shorter and less clean staple.

To facilitate the stripping of the shorter staple from the seed, the trunk of the last delinter of the series is provided with a concave brush with its bristles terminating a short distance from the periphery of the delinter. The brush detains the seeds somewhat in their upward path of travel, and a better opportunity is thus given the delinter to completely strip off their short staple. By this mode of operation not only is the more valuable portion of the fiber separately collected without admixture with particles of the hull or dirt, but the seeds are so thoroughly stripped of their lint that they can be ground up and their oil expressed by mechanical means.

It is essential for carrying out the process of separately detaching and collecting the longer fibers, first, that the delinter shall merely have a rough surface and shall not have bristles or teeth capable of penetrating the ball of fiber surrounding the cotton-seed; secondly, that the feed-trunk shall be interiorly unobstructed, so that there will be nothing to forcibly press the cotton-seed against the delinting-surface. By these precautions the shorter fibers are prevented from being detached until after the longer fibers have been detached. The longer fibers being those which project to the exterior of the mass of lint inclosing the seed are of course those which are most advantageously presented for entanglement with the rough surface of the delinter. Under these conditions the mode of operation of the apparatus will be such that the longer fibers will be first detached by and collected from one part of the apparatus, and the shorter fibers will be subsequently detached by and collected from another part of the apparatus.

It will be perceived that the greater the departure of the deflector from parallelism with the vertical plane of the axis of the delinter the more rapid will be the travel of the cotton-seed through the trunk from the upper end to the discharge end. The deflector is susceptible of a moderate range of adjustment with relation to the axis of the delinter without any material departure of its curved lower edge from the required degree of conformity to the curvature of the part of the delinter immediately beneath it. When, however, the inclination of the axis of the cylindrical delinter is relied upon for promoting the travel of the seeds from the upper end of the trunk to the discharge end, the rapidity of travel of the seed through the trunk may be changed by varying the angle of inclination of the axis of the delinter. In the latter case the trunk and the jacket of the exhaust-chamber are so arranged as to partake of the movements of the delinter during such adjustment, and thus the relation to the delinter of the wall of the trunk which serves as the deflector is constantly preserved.

An incidental feature of great importance is that the feed-hopper, and especially the spouts by which the partially-delinted seeds are conducted from the higher to the lower trunks, respectively, are made of gradually-increasing cross-areas from their upper ends to their lower ends, in order to prevent the masses of more or less delinted seeds from wedging together in the spouts and thereby interrupting the operation of the machine.

Figure 2:
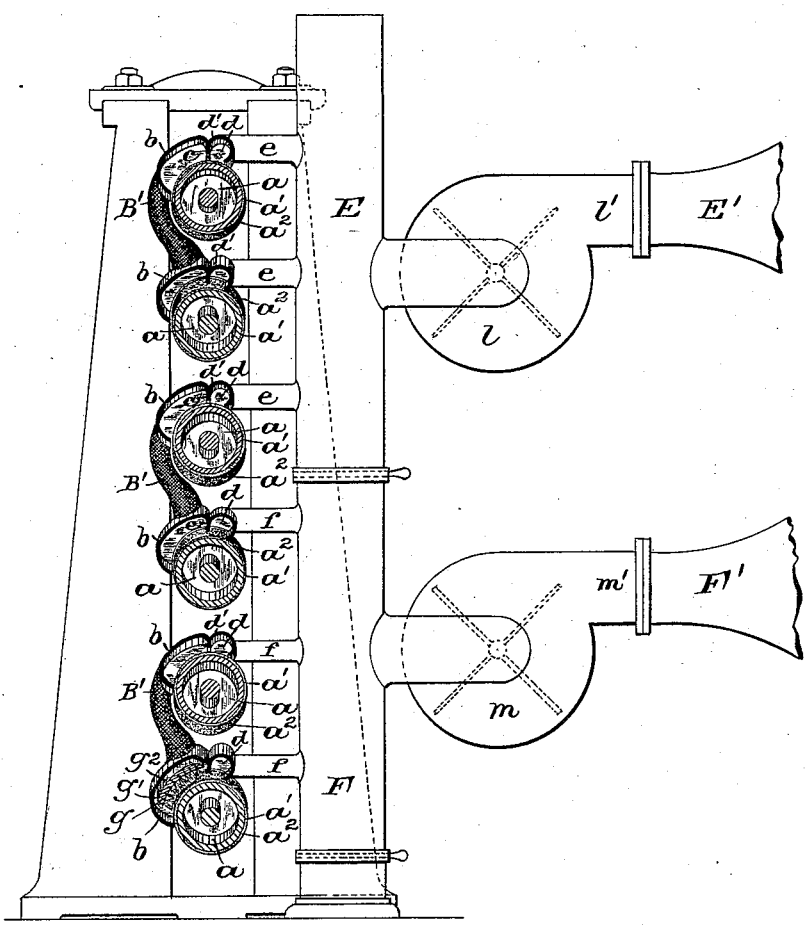
Figure 3:
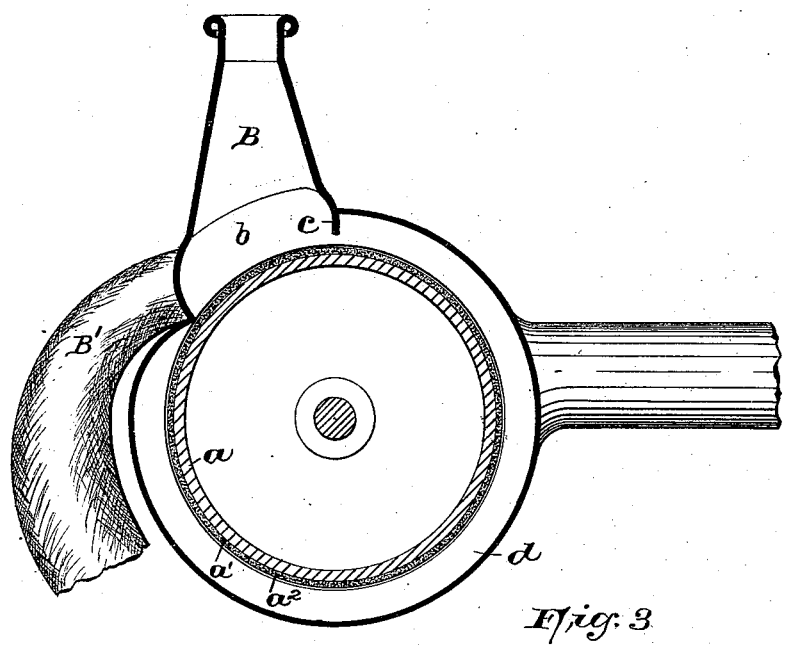
Figure 4:
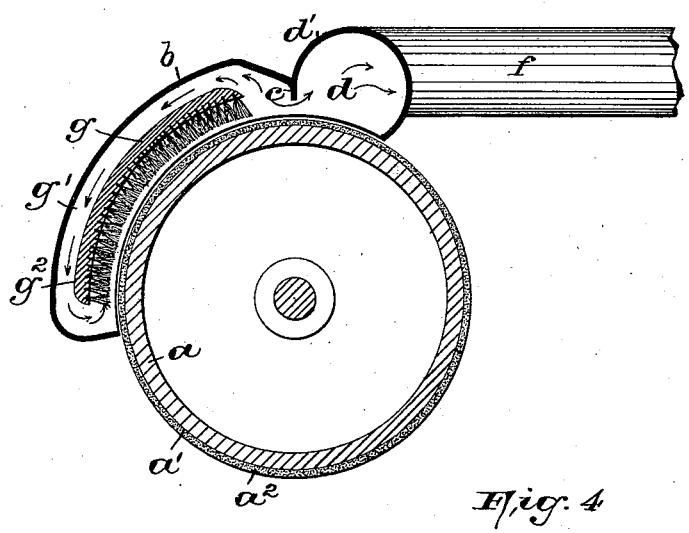
Figure 5:
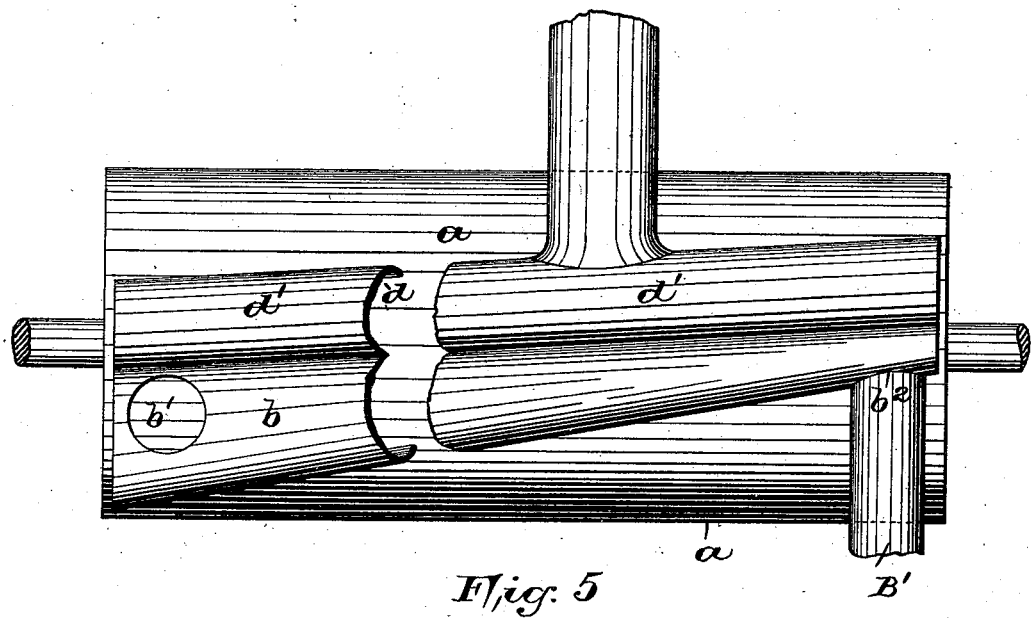
Figure 6:
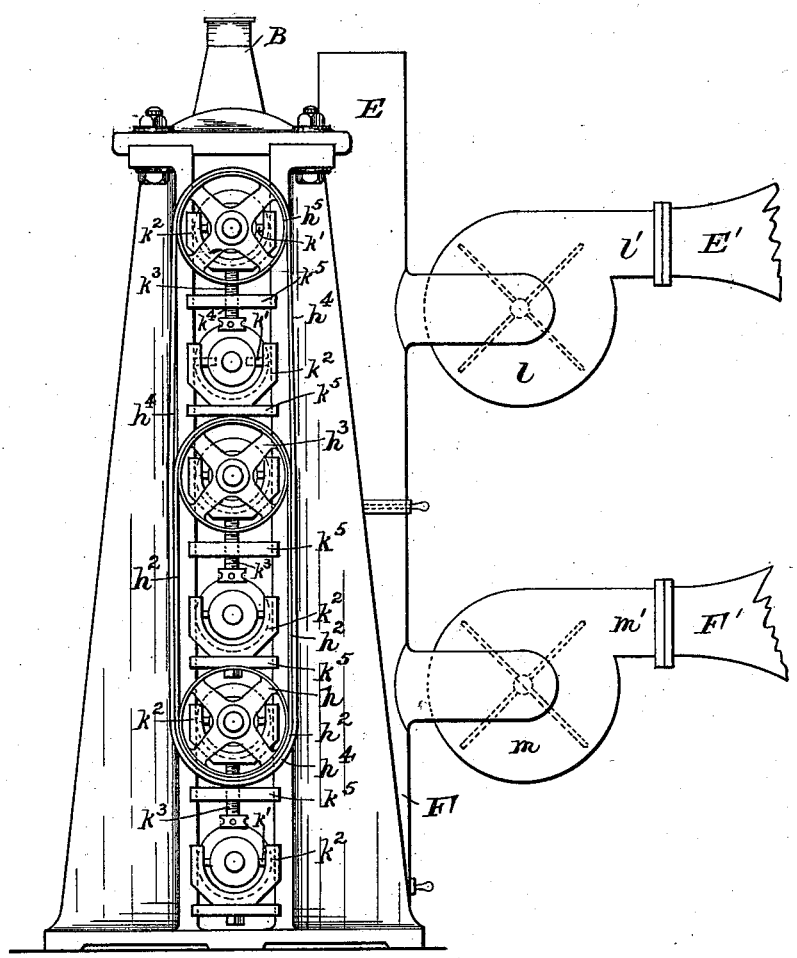

The accompanying drawings, illustrating modifications of the apparatus in detail, and also illustrating an organized machine employing six delinting-cylinders, are as follows:

Figure 1 is a side elevation of a machine employing six delinting-cylinders arranged at different elevations and rotating upon oppositely-inclined axes, respectively. Fig. 2 is a transverse section taken through the plane indicated by the dotted line $x\,x$ on Fig. 1. Fig. 3 is a transverse section of one of the delinting-cylinders, illustrating a modification which consists in extending the jacket of the suction-chamber completely around the part of the delinting-cylinder not covered by the trunk. Fig. 4 is a transverse section of a delinting apparatus, illustrating a modification which consists in introducing into the trunk a brush with a concave face for the purpose of detaining the seeds which have had the greater portion of their fibers detached in order to facilitate the detachment of the shorter fibers remaining adherent to the seeds. Fig. 5 is a top view of a delinting-cylinder employing a deflector occupying a plane which is diagonal to the vertical plane of the axis of the delinter. Fig. 6 is an end elevation of the machine shown in side elevation in Fig. 1.

In the machine represented in Figs. 1, 2, and 6 of the drawings a substantial frame A affords the bearings for six delinting-cylinders 1, 2, 3, 4, 5 and 6, arranged at different elevations with their axes relatively so inclined that the trunks of the higher cylinders discharge their contents from their lower ends into the higher ends of the trunks of the next lower cylinders, respectively. Each of the delinting-cylinders and its appurtenances constitute an apparatus embodying the characteristic features of the present invention. This apparatus, considered by itself, consists of a cylinder $a$, preferably made hollow for the sake of lightness and built of seasoned wood, papier-maché, or other suitable material, with its exterior surface $a'$ rendered abrasive by gluing thereto a coating $a^2$ of emery. On the side of the cylinder which moves in an upward direction there is arranged a trunk $b$, having the same angle of inclination as that of the cylinder, with an opening $b'$ at its higher end to permit the feeding of cotton-seeds into it and an outlet $b^2$ for the discharge of the seeds from its lower end. The trunk, as will be seen, is in the form of a partially-inverted trough, the higher side wall $c$ of which is arranged in or near the vertical plane of the axis of the cylinder, with its edge just clearing the top of the cylinder. The wall $c$ constitutes what is herein called the "deflector." The space between its lower edge and the top of the cylinder is too narrow to permit of the passage of the cotton-seeds, but is wide enough to allow the passage of the fibers which have been caught upon the surface of the cylinder and detached from the seeds. Adjoining the deflector is a suction-chamber $d$, formed by the jacket $d'$, which wholly or partially incloses the portion of the cylinder $a$ not covered by the trunk.

The cylinders 1, 2, 3, 4, 5 and 6 may be regarded as sections of one continuous cylinder, and their trunks and jackets may be regarded, respectively, as similar sections of one continuous trunk and jacket applied to a continuous cylinder. In either case the operation of delinting cotton-seeds will be performed progressively. The longer fibers will be those which are first detached and the shorter fibers those which will be detached subsequently. Hence in the machine represented in Figs. 1 and 2 the suction-chambers of the higher cylinders, 1, 2 and 3, are connected, respectively, by the suction-pipes $e\ e\ e$ with the main suction-pipe E.

The uppermost trunk in the machine represented in Figs. 1 and 2 is provided at its upper end with a hopper B in the form of an inverted truncated cone and at its lower end with a flexible discharge-spout B', of gradually-increasing cross-area from its upper to its lower end, through which the partially-delinted cotton-seed is discharged from the lower end of the trunk of the cylinder 1 to the higher end of the trunk of the cylinder 2. A similar flexible spout serves to discharge the further-delinted cotton-seeds from the lower end of the cylinder 2 to the higher end of the cylinder 3, and so on. The suction-chambers of the lower cylinders, 4, 5 and 6, are connected, respectively, by the pipes $f\ f\ f$ with the main suction-pipe F.

In each of the Figs. 1 and 2 the cylinders of the machine therein illustrated are represented as separated from each other by considerable spaces for the purpose of more clearly showing the general construction, and especially the positions, of the suction-pipes.

As the mass of seeds progress through the machine their bulk is gradually lessened by the detachment and withdrawal of their fibers. Hence, to effectively provide for the progressive delintation of the seeds, there is, as will be seen on reference to Fig. 1, a gradual diminution in the cross-areas of the paths through the successive trunks from the highest trunk, into which the seeds with all their attached fiber are primarily fed, to the lowest trunk, from which the delinted seeds are finally discharged. Such reduction in the cross-areas of the trunks serves to maintain the more or less delinted seeds in closer proximity to the surface of the delinting-cylinders, respectively, and hence facilitates the detachment from the seeds of their shorter fibers.

As an expedient for further promoting the detachment of the shorter fibers, the trunk of the last cylinder—to wit, cylinder 6—may be widened to any desired extent and be provided with the concave brush $g$, the bristles of which just clear the surface of the cylinder 6, and serve to detain the seeds during their successive passages upward to the deflector $c$. From the deflector the seeds fall successively to the bottom of the trunk through the space $g'$ between the back $g^2$ of the brush and the shell of the trunk in the directions indicated by the short arrows, as shown in said space in Fig. 4.

In practice the delinting-cylinder will be preferably of such diameter and be rotated at such a rate as to have a surface speed of upward of eighteen hundred feet per minute.

The rotation of the cylinders may be effected in any convenient way—as, for example, by the system of belts illustrated in Fig. 6, in which, as will be seen, the driving-pulley $h$ is affixed to the shaft of the cylinder 5, to which is also affixed the pulley $h'$. (See Fig. 1.) A belt $h^2$ transmits the motion from the pulley $h'$ to the pulley $h^3$ on the shaft of the cylinder 3, and an exterior belt, $h^4$, riding over the belt $h^2$ transmits the motion from the pulley $h'$ to the pulley $h^5$ of the cylinder 1. A similar system of pulleys and belts is arranged at the opposite end of the machine for driving the cylinders 6, 4, and 2.

In Fig. 1 the inclination of the axes of the delinting-cylinders is exaggerated for the sake of illustration. In practice it will not usually be necessary that the axes of the delinting-cylinders shall have a gradient of more than one in one hundred. Provision is made, however, for adjusting the inclinations of the shafts of the cylinders. This is effected by providing each journal-box $k$ with lateral trunnions $k'\ k'$, which are seated in a carriage $k^2$, adapted to slide in vertical guides in the upright portion of the frame of the machine. Each carriage is vertically adjusted by, and is supported upon the upper end of, a vertical screw-bolt $k^3$ inserted in an upright direction through a hole $k^4$, tapped through a stationary cross-bar $k^5$.

It will be observed that in the suction-chambers represented in Fig. 2 opportunity necessarily exists for the suction of air into the suction-chamber through the small space between the periphery of the delinter and the edge of the wall of the suction-chamber opposite that which is united to the deflector. Such suction of external air into the suction-chamber may, if desired, be prevented by extending the jacket $d'$ entirely around the portion of the cylinder not covered by the trunk, as represented in Fig. 3; but it will not be necessary to adopt this expedient if a strong suction be maintained from the suction-chambers through the suction-pipes connected therewith respectively.

The necessary suction can be easily maintained by connecting the main suction-pipes E F, respectively, with the induction-openings of ordinary centrifugal blowers $l$ and $m$, as indicated in Fig. 2. The eduction-passages $l'$ $m'$ of the blowers are respectively connected with the trunks E' F' of suitable cotton-condensers. By the use of such blowers a sufficiently-strong air-current can be maintained to withdraw all the cotton fibers from the suction-chambers and blow the fibers into the condensers.

What is claimed as the invention is—

1. In apparatus for delinting cotton-seed, the combination, as herein set forth, of an exteriorly-unobstructed feed-trunk gradually diminishing in its cross-area from its receiving end to its discharging end, a rapidly-rotating rough-surfaced cylinder, a deflector forming a wall of said trunk and arranged above said cylinder in or near the vertical plane of the axis thereof, with its lower edge just clearing the part of said cylinder over which the deflector is arranged, and a suction-chamber connecting with a condenser and with the space between said cylinder and the lower edge of said deflector.

2. Apparatus for delinting cotton-seed, consisting of a rapidly-rotating rough-surfaced cylinder, an interiorly-unobstructed trunk having a feed-inlet at one end and a discharge-outlet at the other end, and covering the upper portion of the ascending side of the said rotating cylinder, a deflector forming the higher wall of said trunk, with its lower edge just clearing the surface of the said cylinder, a suction-chamber communicating with said trunk through the space between said cylinder and the under edge of said deflector, a pipe connecting said suction-chamber with a condenser, and means for exhausting the air through said pipe from said suction-chamber, as and for the purposes described.

3. In a machine for progressively delinting cotton-seed, a series of rapidly-moving delinters having suitably-roughened surfaces; a like series of interiorly-unobstructed feed-trunks for feeding cotton-seed against the surfaces of said delinters, respectively; a like series of deflectors constituting walls of said feed-trunks and arranged above and with their lower edges just clearing the surfaces of the said delinters, respectively; a like series of suction-chambers connected with said trunks by the spaces between the surfaces of the said delinters and the lower edges of the said deflectors, respectively, in combination with a multiplicity of cotton-condensers separately connected by suitable pipes with different members of the said series of suction-chambers and means for establishing currents of air from said suction-chambers into said cotton-condensers, respectively.

4. The combination of a rotating delinting-cylinder, a feed-trunk covering a portion of the ascending side of said cylinder; a deflector constituting the higher wall of the said trunk; a stationary concave brush fixed within said trunk; a suction-chamber communicating with the interior of the said trunk through a narrow space between the said delinting-cylinder and the under edge of said deflector, and means for exhausting the air from said suction-chamber, substantially as described and for the purpose set forth.

5. In a machine for progressively delinting cotton-seeds, a series of rough-surfaced delinters, with deflectors and suction-chambers substantially such as herein described, in combination with feed-trunks of progressively-diminishing cross-areas, substantially as and for the purpose set forth.

6. In a machine for delinting cotton-seeds, a series of superposed rapidly-moving delinters and a like series of feed-trunks for feeding cotton-seeds against the surfaces of said delinters, respectively, in combination with spouts of gradually-increasing cross-area from their upper to their lower ends, for conducting the partially-delinted cotton-seeds from the higher to the lower feed-trunks, respectively.

OWEN T. BUGG.

Witnesses:
A. M. JONES,
E. GATTERER.